United States Patent [19]
Raines et al.

[11] Patent Number: 5,064,168
[45] Date of Patent: Nov. 12, 1991

[54] SPOOL VALVE WITH OFFSET OUTLET

[75] Inventors: Kenneth Raines, Bethlehem; John D. Grimm, Germansville, both of Pa.

[73] Assignee: Burron Medical, Inc.

[21] Appl. No.: 644,766

[22] Filed: Jan. 23, 1991

[51] Int. Cl.⁵ .............................................. F16K 3/24
[52] U.S. Cl. .................................. 251/322; 251/323; 251/324
[58] Field of Search ................ 251/322, 323, 324, 321

[56] References Cited
U.S. PATENT DOCUMENTS 3,826,467 7/1974 Hart et al. ........................ 251/324 X
4,015,632 4/1977 Frahm et al. .................... 251/321 X Primary Examiner—Arnold Rosenthal
Attorney, Agent, or Firm—Shoemaker & Mattare, Ltd.

[57] ABSTRACT

A valve includes a one-piece plastic body, and a plunger assembly inserted into the body from one end. The body includes a central cylindrical portion extending along a first axis, a tubular outlet portion extending along a second axis parallel to and offset from the first, so as to intersect the central portion only over a portion of the length of each, and a tubular inlet extending along a third axis perpendicular to the first axis and above the intersected portion thereof. An uninterruped 360° band forming a seat remains between the outlet and the inlet. The plunger assembly includes a resilient, circumferential lip that engages the seat in the closed position of the valve, and a circumferential recess adjacent the lip, that permits fluid to flow through the valve in the open position.

7 Claims, 2 Drawing Sheets

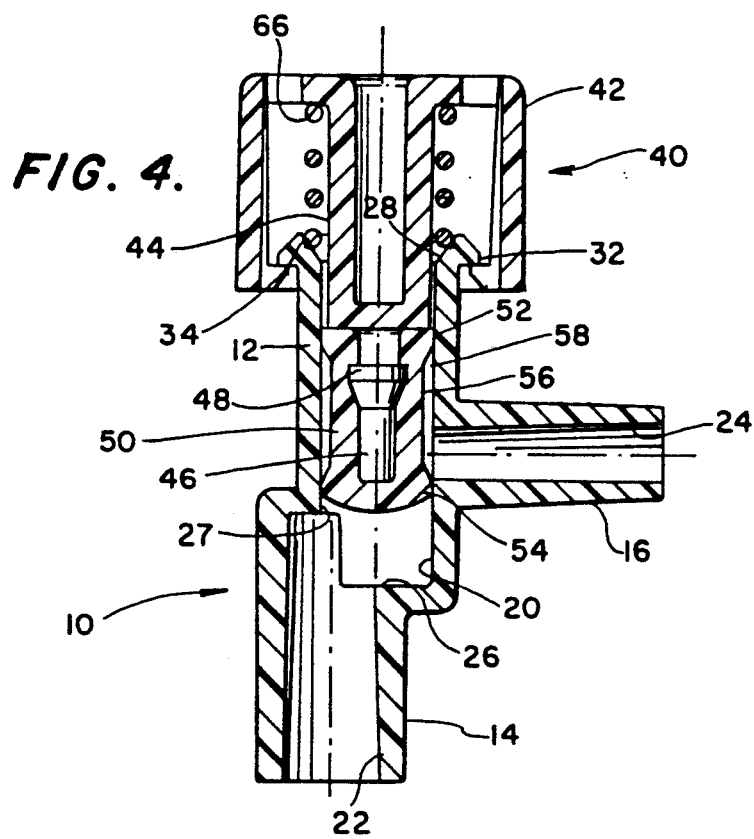
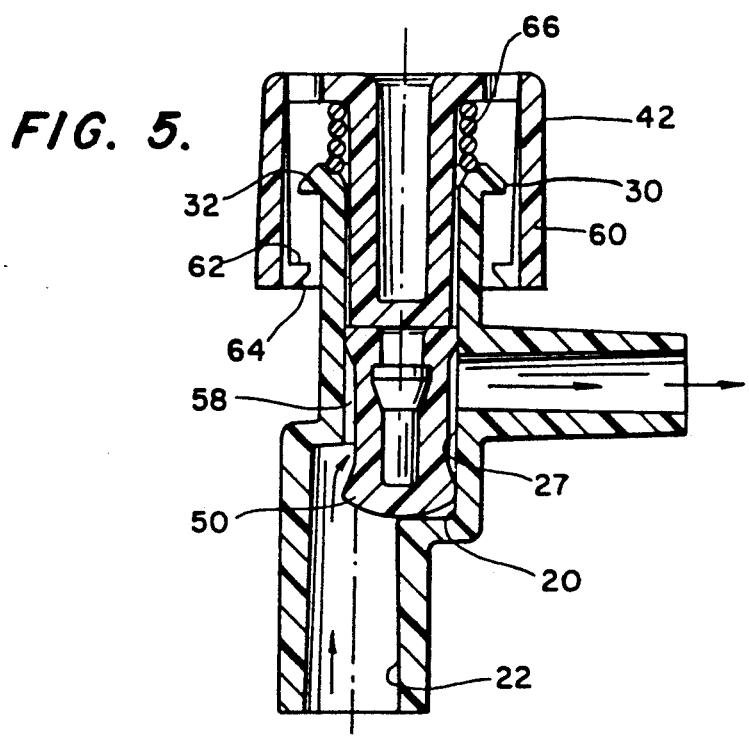

SPOOL VALVE WITH OFFSET OUTLET

BACKGROUND OF THE INVENTION

This invention relates generally to valves, and more particularly to a valve having a spool-type resilient cap and a linear, spring biased actuator.

There are many valves of this general type, as shown for example by U.S. Pat. Nos. 591,228 and 4,497,468.

There is a need for a valve which, while attached to a surgical instrument such as an irrigation/aspiration probe, can be operated with one hand. Instruments such as probes are typically provided with stopcocks, which require two hands to operate, and do not close automatically.

Ergonomically, it is desirable for a valve to be mounted at right angles to a probe, and to attach to a standard medical luer taper.

For safety reasons, it is also desirable for the connection to be in-line with the applied activation force. The valve shown in U.S. Pat. No. 491,228, for instance, would require an elbow for attachment as described above. The elbow would create a bending moment, and a resulting potential for breakage, particularly if the valve were made of plastic.

It is also desirable to avoid placing a return spring within the fluid flowpath, and to provide a design that permits in-line vertical assembly of components without gluing or welding, to facilitate high volume, low cost production.

SUMMARY OF THE INVENTION

In view of the foregoing considerations, it is an object of the invention is to provide an inexpensive valve of simple manufacture and assembly, suitable for medical applications, or other single-use applications.

Another object is to provide a spool-type valve substantially immune to inlet pressure effects.

A further object is to avoid breakage of valve ports from applied bending moments.

A valve embodying the invention includes a one-piece plastic body, and a plunger assembly inserted into the body from one end. The body includes a central cylindrical portion, a tubular outlet portion that is parallel, but offset radially and lengthwise, from the central portion, so as to intersect it only over a portion of its length, and a tubular inlet extending perpendicular to the central portion, and above the intersected portion thereof. An uninterrupted 360° band of the central bore form a seat between the outlet and the inlet. The plunger assembly includes a resilient, circumferential lip that engages the seat in the closed position of the valve, and a circumferential recess adjacent the lip, that permits fluid to flow through the valve in its open position.

An advantage of the invention is that it provides sure on-off performance, required for safety purposes in medical fluid administration procedures. Another advantage is that it can be used by medical personnel to control fluid flow in operations demanding such control. The unique offset cylindrical design of the body of this valve permits the part to be made in one piece, thus assuring a leak-proof component, and permitting economical manufacture.

Additionally, the valve includes a female luer taper parallel, and in close proximity to, the plunger centerline. This provides a strong leak-proof connection, which is not susceptible to breakage when the plunger is depressed.

BRIEF DESCRIPTION OF THE DRAWINGS

In the accompanying drawings,

FIGS. 4 and 5 are sectional views taken along the plane 4—4 in FIG. 3, showning the valve in its closed and open positions, respectively.

DESCRIPTION OF THE PREFERRED EMBODIMENT

Figure 1:
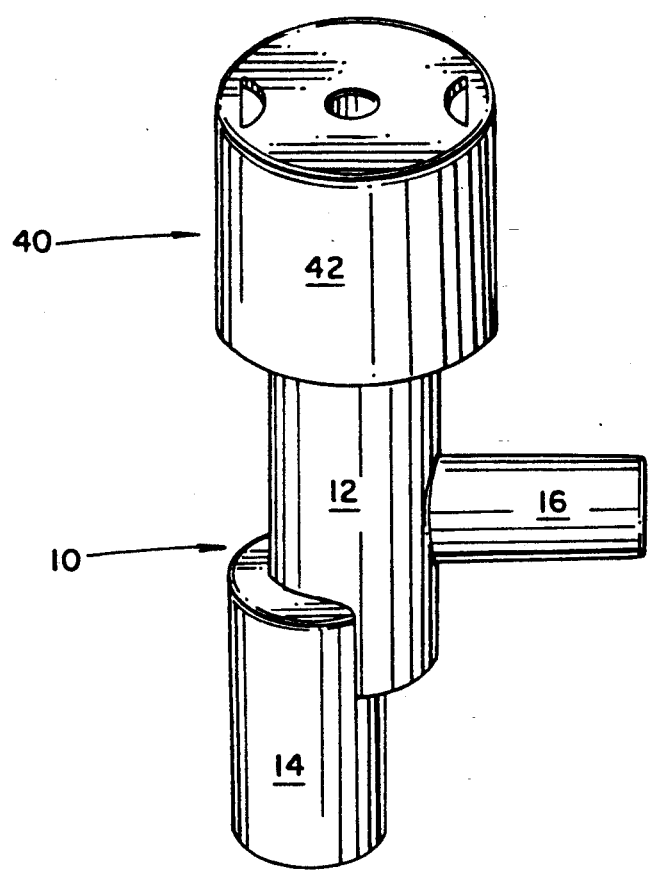
FIG. 1 is an isometric view of a valve embodying the invention.
Figure 2:
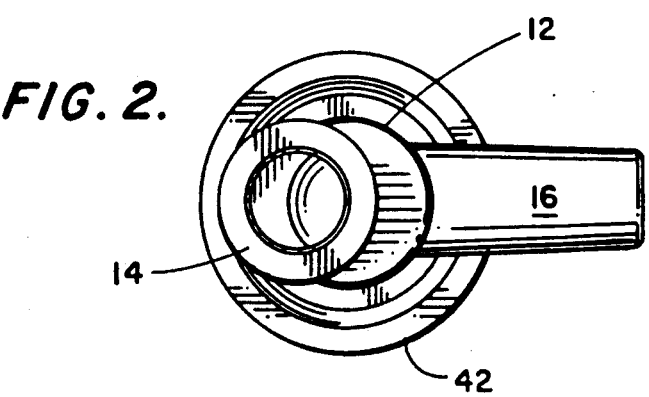
FIG. 2 is a bottom plan view thereof.
Figure 3:
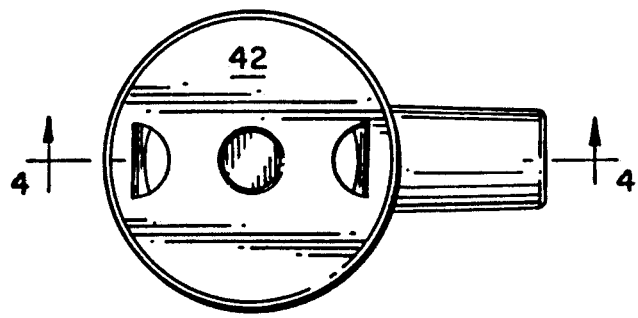
FIG. 3 is a top plan view thereof.

As shown in the drawings, a valve embodying the invention comprises a molded plastic body 10 including a central portion 12, an overlapping tubular outlet 14 having an axis parallel to, but offset from, the central portion, and a tubular inlet 16 extending laterally from the central portion, on the side opposite the outlet, and above the level of the outlet.

Each of the three body portions is generally tubular; the inner surfaces or bores of the portions 12, 14 and 16 are designated 20, 22 and 24 respectively in FIGS. 4 and 5. It can be seen that the bores 22 is provided with a female luer taper for attachment to compatible devices. (The central portion's bore 20, however, is cylindrical.) The axis of the outlet bore is offset from the axis of the central bore by less than the sum of the radii of the two bores, so that the bores intersect over a portion of the length of both, between the lower end of the central bore and the upper end of the outlet. The offset permits fluid to flow around the bottom lip of the plunger described below, and the bottom of the central bore provides a shoulder 26 which acts as a stop for the plunger. It is necessary that the top of the outlet bore be somewhat below the bottom of the inlet bore, to provide a seat 27 in the form of a short band of 360° uninterrupted surface within the bore 20.

The upper end of the central portion has an internal chamfer 28, to facilitate insertion of the plunger, and a circumferential outer flange 30, the upper edge of which is chamfered at 32. The inner chamfer 28 is slightly counterbored at 34.

The other major component of the valve is a plunger assembly, designated generally by the numeral 40, which comprises a hollow cap 42 molded integrally with a downwardly extending shaft 44 that terminates at a distal tip 46 having a circumferential barb 48. A resilient plunger 50 is pushed onto the barb, which retains the plunger on the tip. The plunger is spool-shaped, being mushroomed slightly at both ends, so that two lips 52 and 54, slightly larger in diameter than the bore 20, are defined on either side of a central cylindrical outer surface 56 of reduced diameter. The annular space 58 between the bore 20 and the surface 56 permits fluid to flow through the valve when the valve is in the position of FIG. 5, as suggested by the arrows.

The cap 42 has a cylindrical rim 60, provided at its bottom edge with an internal, circumferential flange 62, chamfered on the bottom at 64 (FIG. 5). The inner diameter of the flange 62 is less than the outer diameter of the flange 30, so that once assembled, these flanges cooperate (see FIG. 4) to prevent removal of the plunger assembly. The chamfers 32 and 64 permit the cap to be forced over the body flange during assembly.

A stainless steel compression coil spring 66 is disposed around the shaft 44 of the plunger, and abuts the bottom of the top surface of the cap, and the counterbore 34 of the body portion, which centers it around the shaft.

The rest position of the valve is shown in FIG. 4, wherein the spring holds the plunger in its extreme upward position defined by the flanges 30 and 62. The parts are dimensioned so that 360° of the lower lip of the plunger at this point is in contact with the seat in the valve bore, providing a fluid-tight seal. The valve is opened by depressing the plunger (FIG. 5) to the open position determined by interference between the plunger and the shoulder 26, whereupon fluid can enter and pass through the annular space 58 around the plunger, from the outlet to the inlet.

Dimensions of the valve can be varied for various applications. In the presently contemplated medical application, the valve is sized to pass 100 ml per minute of 23° C. water at a head differential of one meter, and the valve is design not to leak under inlet and outlet pressures of up to 45 psi. The material used for the body and plunger are USP Class VI approved for biocompatability.

The portions 16 and 18 are designated "outlet" and "inlet" above, but the flow direction could be reversed, if desired, for certain applications, and in fact, bidirectional flow is contemplated. These designations, when used in the claims that follow, are not intended to limit the invention to a particular use; they are used only for convenience and clarity. Similarly, use of the terms "top" or the like, is not intended to limit use of the invention to a particular orientation.

Inasmuch as the invention is subject to modifications and variations, it is intended that the foregoing description and the accompanying drawings shall be interpreted as illustrative of only one form of the invention, whose scope is to be measured by the following claims.

I claim:

1. A valve comprising
a one-piece plastic body having a central cylindrical portion extending along a first axis, a tubular outlet portion extending along a second axis parallel to and offset from the first, said central portion and said outlet portion having bores which intersect only over a portion of the length of each, and a tubular inlet extending along a third axis perpendicular to the first axis and above the intersected portion of the central bore that an uninterrupted 360° band portion of the central bore, forming a seat remains between the outlet and the inlet, and
a plunger assembly including a resilient, circumferential lip thereon, and a circumferential recess adjacent thereto of lesser diameter than said central bore, said plunger being movable between a closed position in which the lip abuts the 360° band, and an open position in which the lip extends into the intersected portion of the bore, and the recess provides a flow channel between the outlet and the inlet.

2. The invention of claim 1, wherein the plunger assembly further comprises
a shaft axially movable within the central bore, the plunger being mounted at one end of the shaft, and
spring means for biasing the shaft to the closed position of the plunger.

3. The invention of claim 2, further comprising means for limiting movement of said plunger away from said outlet, to define said closed position, and means for limiting movement of said plunger toward said outlet, to define said open position.

4. The invention of claim 2, wherein said shaft has a barbed tip at one end, and the plunger is a resilient spool-shaped member mounted on the tip, the plunger having two circumferential lips astride the circumferential recess.

5. The invention of claim 3, wherein the means limiting plunger movement toward the outlet is a shoulder formed at one end of the central bore closer to the outlet.

6. The invention of claim 3, wherein the cap has a cylindrical rim extending around part of the central portion of the body, and the means for limiting movement of the plunger away from the outlet comprises an external flange at the upper end of the central body portion, cooperating with an internal flange on said rim of lesser diameter than said external flange.

7. The invention of claim 6, wherein the upper and lower flanges have opposing chamfers, to facilitate assembly of the valve.

* * * * *